S. J. MOLONEY.
SCREW.
APPLICATION FILED DEC. 2, 1914.

1,152,960.                                         Patented Sept. 7, 1915.

Witnesses:

Inventor,
Simon J. Moloney,
by Joshua R. H. Potts
His Attorney.

UNITED STATES PATENT OFFICE.

SIMON J. MOLONEY, OF CHICAGO, ILLINOIS.

SCREW.

1,152,960.  Specification of Letters Patent.  Patented Sept. 7, 1915.

Application filed December 2, 1914. Serial No. 875,191.

*To all whom it may concern:*

Be it known that I, SIMON J. MOLONEY, a citizen of the United States, and a resident of the city of Chicago, county of Cook, and State of Illinois, have invented certain new and useful Improvements in Screws, of which the following is a specification.

My invention relates to improvements in screws, and has for its object the provision of a construction of this character by means of which a screw may be guarded against removal or loosening.

The invention consists in the combinations and arrangements of parts hereinafter described and claimed.

Figure 1:
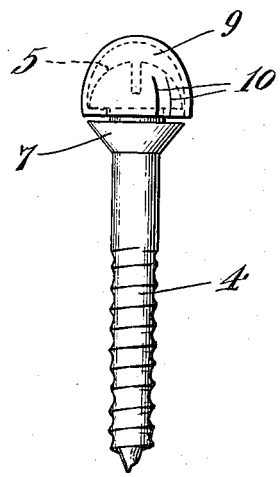
Figure 2:
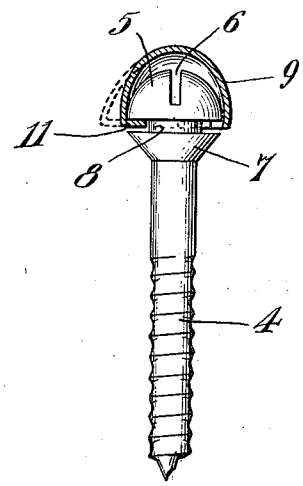
Figure 3:
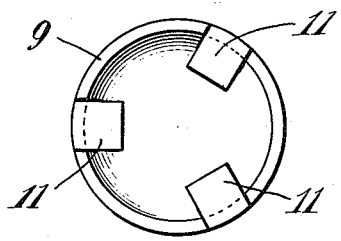

The invention will be best understood by reference to the accompanying drawing forming a part of this specification, and in which, Figure 1 is a side view of a screw embodying my invention, shown in position of use, Fig. 2, a similar view but showing the guarding means in section, and Fig. 3, an enlarged bottom plan view of a locking cap employed in the construction.

The preferred form of construction as illustrated in the drawing comprises a screw shank 4 provided with a screw head 5 having a screw driver slot 6 therein. The lower portion 7 of head 5 is given a conical shape in order to fit an ordinary counter-sink around the screw hole, as will be readily understood. The head 5 is also provided with an annular groove 8 and a substantially hemispherical sheet metal cap 9 is arranged to fit over said head, the sides of said cap being provided with slits 10 forming spring leaves therebetween and the lower ends of said leaves are provided with inwardly extending projections 11 adapted to engage groove 8, as shown in Fig. 2.

In use, the screw is inserted and driven home in the usual manner with the portion 7 of the head fitting within the counter-sink. Then, the cap 9 is pressed over said head, said projections riding on the rounded sides of head 5 and automatically snapping into engagement with groove 8 thus locking said cap in position. The cap prevents access to the screw driver slot 6 and thus prevents removal of the screw.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a screw shank and head, there being an annular groove extending around said head, of a cap fitting over said head and provided with spring fastenings engaging said groove, substantially as described.

2. The combination with a screw shank and head provided with a screw driver slot, there being an annular groove formed in said head, of a substantially hemispherical metallic cap fitting over said head, the sides of said cap being slit to form spring leaves and the lower ends of said leaves being turned inwardly to automatically engage said groove, substantially as described.

In testimony whereof I have signed my name to this specification in the presence of two subscribing witnesses.

SIMON J. MOLONEY.

Witnesses:
JOSHUA R. H. POTTS,
B. G. RICHARDS.